United States Patent [19]

Cavaliere et al.

[11] 3,879,621

[45] Apr. 22, 1975

[54] SENSE AMPLIFIER

[75] Inventors: Joseph Richard Cavaliere, Hopewell Junction; William John Scarpero, Jr., Wappingers Falls, both of N.Y.

[73] Assignee: International Business Machines Corporation, Armonk, N.Y.

[22] Filed: Apr. 18, 1973

[21] Appl. No.: 352,143

[52] U.S. Cl. ................ 307/279; 307/205; 307/238; 340/173 FF

[51] Int. Cl. ........................................ H03k 3/281

[58] Field of Search ........... 307/205, 213, 238, 251, 307/279, 303, 304, 235; 340/173 FF

[56] References Cited

UNITED STATES PATENTS

| | | | |
|---|---|---|---|
| 3,267,295 | 8/1966 | Zuk | 307/205 |
| 3,431,433 | 3/1969 | Ball et al. | 340/173 FF |
| 3,440,444 | 4/1969 | Rapp | 307/205 X |
| 3,638,039 | 1/1972 | Chen et al. | 307/238 |

*Primary Examiner*—John Zazworsky
*Attorney, Agent, or Firm*—William J. Dick

[57] ABSTRACT

An FET sense amplifier for converting a double rail differential memory output signal to a full logic output signal, the amplifier comprising first and second pairs of FETs coupled together at a pair of common nodes. In one embodiment, first and second field effect transistors of the same conductive type are connected to respective ones of the nodes. A third field effect transistor of a second conductive type is connected to one of the pairs of FETs, the first, second and third field effect transistors are interconnected so that when the first and second transistors conduct the third transistor is cut off, and when the first and second transistors are cut off, the third transistor conducts.

16 Claims, 5 Drawing Figures

SENSE AMPLIFIER

SUMMARY OF THE INVENTION AND STATE OF THE PRIOR ART

The present invention relates to sense amplifiers, and more particularly relates to an FET sense amplifier for converting a double rail differential memory output signal to a full-logic output signal.

Complementary metal oxide semiconductor, field effect transistor (CMOSFET) storage cells are well known in the art. For example, such a cell is described in U.S. Pat. No. 3,521,242 issued on July 21, 1970 to Katz (see FIG. 8 ). Typically, the output or sensing of information on the bit lines is difficult because of the lack of a full logic level. Additionally, additional amplification or inversion is usually necessary in order to obtain an output which is useful for subsequent data manipulation. There have been numberous patents which employ techniques for providing a full logic output from the data received from the right and left bit lines, or bit sense lines, for converting such output of a CMOS FET memory into a full logic level double rail data output. For example see U.S. Pat. No. 3,600,609 issued on Aug. 17, 1971 to Christensen wherein a pair of cross coupled IGFET devices are connected in a race mode and combined with IGFET inverters to convert the differential double rail output of an IGFET memory circuit into a full logic level double rail data output. However, even the Christensen "read" amplifier tends to load the bit sense lines and does not isolate the bit sense lines when performing an output function. Additionally, Christensen requires an additional stage of amplification to obtain full logic levels.

In view of the above it is a principal object of the present invention to provide a novel sense amplifier particularly adapted for use with CMOS FET memory systems.

Another object of the present invention is to provide a novel sense amplifier which is capable of isolating the bits sense lines of such a memory.

Still another object of the presnet invention is to provide a novel sense amplifier which is capable of providing a full logic level output while isolating the bit sense line.

Other objects and a more complete understanding of the invention may be had by referring to the following specification and claims taken in conjunction with the accompanying drawings in which:

Figure 1:
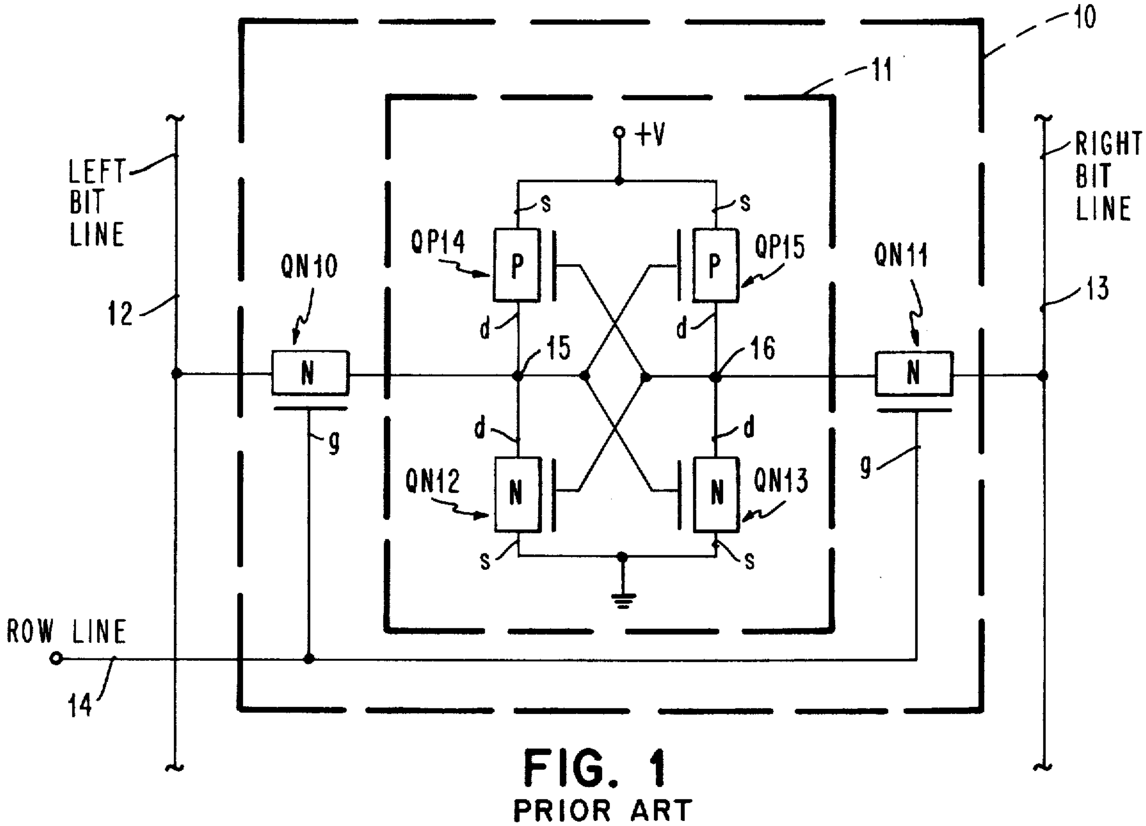
FIG. 1 PRIOR ART
FIG. 1 is a circuit diagram of a typical CMOS memory cell which may be utilized with the novel sense amplifier of the present invention.

Referring now to the drawings, and particularly FIG. 1, a typical six device, complementary metal oxide semiconductor, field effect transistor (CMOSFET), D.C. stable cell 10 is shown therein. The complete cell comprises the typical four device cell 11 with a pair of gating FET means or transistors QN10, QN11, respectively coupled to the left and right bit lines (or bit sense lines) 12 and 13. Each of the gating transistors includes a gating electrode and gated electrodes, the gated electrodes conventionally being called the source and drain, and the gating electrode being called the gate. Inasmuch as the gating FET means are bilateral devices, the source and drain are not designated with the conventional *s* and *d*. The gates *g* of each of the FET means QN10 and QN11 is connected to a row line 14 which is capable of biasing the FET means into and out of their conductive states, to either allow information (voltage levels) to proceed from the bit lines into the four device cell 11 or out of the four device cell onto the bit lines 12 and 13.

The four device memory cell 11 includes a first N conduction type FET means QN12 and a first P conduction type FET means QP14 having their conduction paths connected in series in a first circuit branch between a first reference potential (ground) and a second potential level or the positive terminal of a source of power of V+ volts. The drains *d* of the FET means are connected by negligible impedance means to a node or junction 15 and to the gates *g* of a N condution type FET means QN13 and a second P type conduction FET means QN15. In a like manner transistors QN13 and QP15 have their conduction paths connected in series in a second circuit branch which is in parallel with the first circuit branch, the drains *d* of transistors QN13 and QP15 connected by negligible impedance means to a node or junction 16 and to the gates *g* of transistors QN12 and QP14. As is conventional, the cell just described is bistable and, in either state, draws no appreciable current so that in the steady state mode, power dissipation is extremely low. For example, when transistors QN12 and QP14 have V+ volts applied at their gates *g*, transistor QN12 conducts while transistor QP14 is essentially biased off. The voltage, therefore, at node 15 is at the first potential level or, in the illustrated instance, at circuit ground while a very small or negligible current flows through transistor QP14. The voltage at node or junction 15 is then applied to the gating electrodes of transistors QN13 and QP15 biasing transistor QP15 on and QN13 off. In this manner, the voltage at node 16 is approxiamtely V+ which maintains the transistors in the state as originally set forth above. If an output is taken from either nodes 15 or 16, the memory cell can then be considered as storing either a binary one (from node 16) or a binary zero (from node 15). The manner in which FET means or transistors QN10 and QN11 cooperate with the cross coupled complementary symmetry bistable cell 11 to read and write as associated with the bit and row lines will be more fully explained hereinafter.

In order to provide a full logic output while being isolated from the bit sense lines and therefore inhibit loading by the bit sense lines, and in accordance with the present invention, a novel sense amplifier 20 is provided. To this end and referring now to FIG. 2, the sense amplifier 20 comprises a first and second pair 21 and 22 respectively of cross coupled FET means, the first pair 21 including P type conduction FET's QP1, QP2 and the second cross coupled pair 22 including N type conduction FET's QN1 and QN2. Each of the FET means, as is conventional, includes a gating electrode designated *g* and first and second gated electodes designated source *s* and drain *d*, as conventional in field effect transistors. As illustrated, negligible impedance means interconnect the pairs, in the illustrated instance the drains of QP1 and QN1, and the drains of QP2 and QN2, to form first and second common nodes A and B providing, as will be more fully explained hereinafter, an output from a selected one of the nodes. As shown, the common nodes A and B are connected to the gating electrodes *g* of each FET means of a pair. For example, node A is connected to the gating electrodes *g* of QP2 and QN2 while the node B is connected to the gating electrodes *g* of QP1 and QN2 respectively. Additionally, the sources of QP1 and QP2 are connected together to a common source of power at a second potential of V+ volts, while the sources of QN1 and QN2 are also connected together by negligible impedance means.

Means are provided to isolate the first and second pairs of cross coupled FET means from the left and right bit lines 12 and 13 respectively while permitting the nodes A and B to rise to full signal levels (full logic outputs) and without loading by bit sense lines 12 and 13. To this end, and referring once again to FIG. 2, active first and second signal input means QP3 and QP4 are connected respectively to the first and second nodes A and B to provide an input to the cross coupled FET means and isolate the left and right bit sense lines when desired. As illustrated, the active first and second signal input means comprise, preferably, FET means of a first conductive type, in the illustrated instance P-type, each of the FET means having a gating electrode or gate *g* and gated electrodes including a source *s* and drain *d*. It should be noted that in the six device cell described with reference to FIG. 1, and illustrated as being connected in parallel or across the left and right bit sense lines 12 and 13 in FIG. 2, the N device gates QN10 and QN11, QN10A and QN11A, QN1ON, QN11N, are bilateral devices inasmuch as current can flow in either direction and these devices act as switches for such purpose. Unlike those devices, QP3 and QP4 act as signal input means to nodes A and B, and during tha time the source and drains of each may be appropriately designated. Of course if QP3 and QP4 are of the second conductive type, that is N channel FETs, the source and drains would be reversed.

As heretofore described, the gated electrodes of one of the pairs of cross coupled FET means is connected to the second potential of the source of power i.e., V+ volts. However the sources *s* of the other pair of cross coupled FET means QN1 and QN2, are connected to a pulse source means to selectively couple the second pair of cross coupled FET means to the first potential of the source of power, in the illustrated instance circuit ground. To this end, and referring once again to FIG. 2, the pulse source means comprises FET means QN3, the transistor having a gating electrode or gate *g* and gated electrodes including a source *s* and drain *d*. In the illustrated instance the gated electrode or drain *d* is connected by negligible impedance means to the sources of each of the second pair 22 of cross coupled FET means. As shown, the transistor QN3 is, in the preferred mode, of the opposite conduction type than the FET means QP3, QP4, in the illustrated instance the FET means being an N channel device.

In operation, means are provided for biasing the signal input means (QP3, QP4) and the pulse source means (QN3) to opposite states of conduction such that when the signal input means is biased to conduct, the pulse source means is biased to its opposite state, i.e., non-conduction. To this end, and as illustrated in one embodiment of the invention, the signal input means QP3, QP4 and the pulse source means, QN3, all have their gates (g) connected to a source of pulses L.

Assuming that the memory cells, i.e., cell 1, 2, etc., through cell N have information therein, i.e., and referring to FIG. 1 that node 16 is at substantially V+ volts, while node 15 is at substantially zero volts, or vice versa, the manner in which the sense amplifier cooperates to provide a full logic output from the sense line to read a selected cell, is as follows:

1. both left and right bit lines are charged to the second potential of V+ volts.
2. the particular cell is selected by raising the row line to V+ volts.
3. the row line potential is kept at V+ a sufficient time to discharge one of the left or right bit lines by a predetermined amount.
4. the sense amplifier, which may be considered an amplifying sense latch, is set (i.e., L is brought to V+ volts) permitting a full logic output to be transmitted to and for further processing, for example to a buffer.

Figure 3:
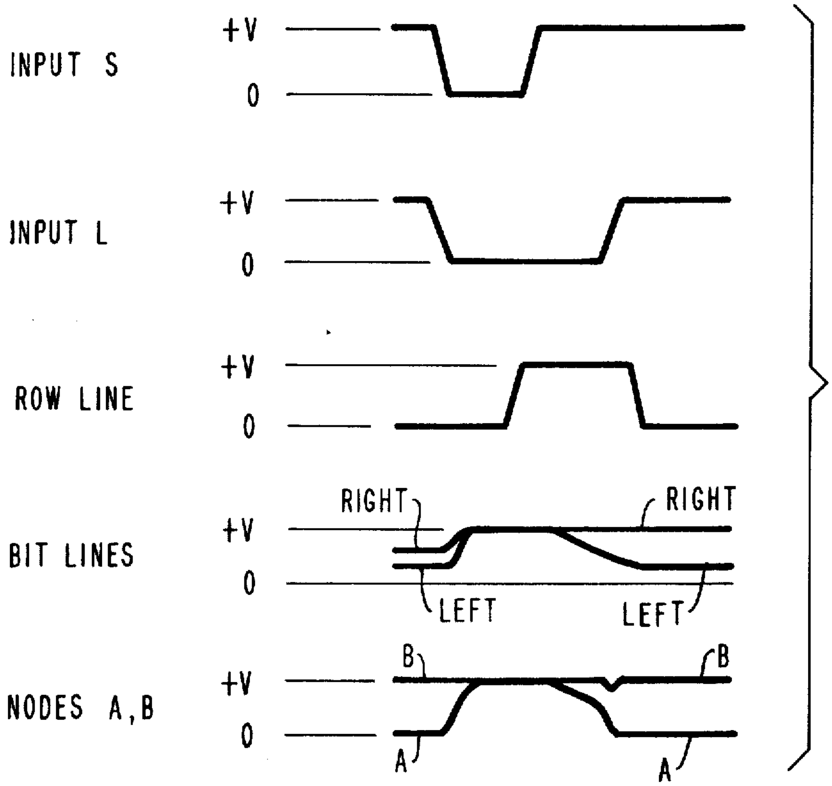
FIG. 3 is a read timing chart utilized with the storage cell organization and sense amplifier of FIG. 2.
Figure 2:
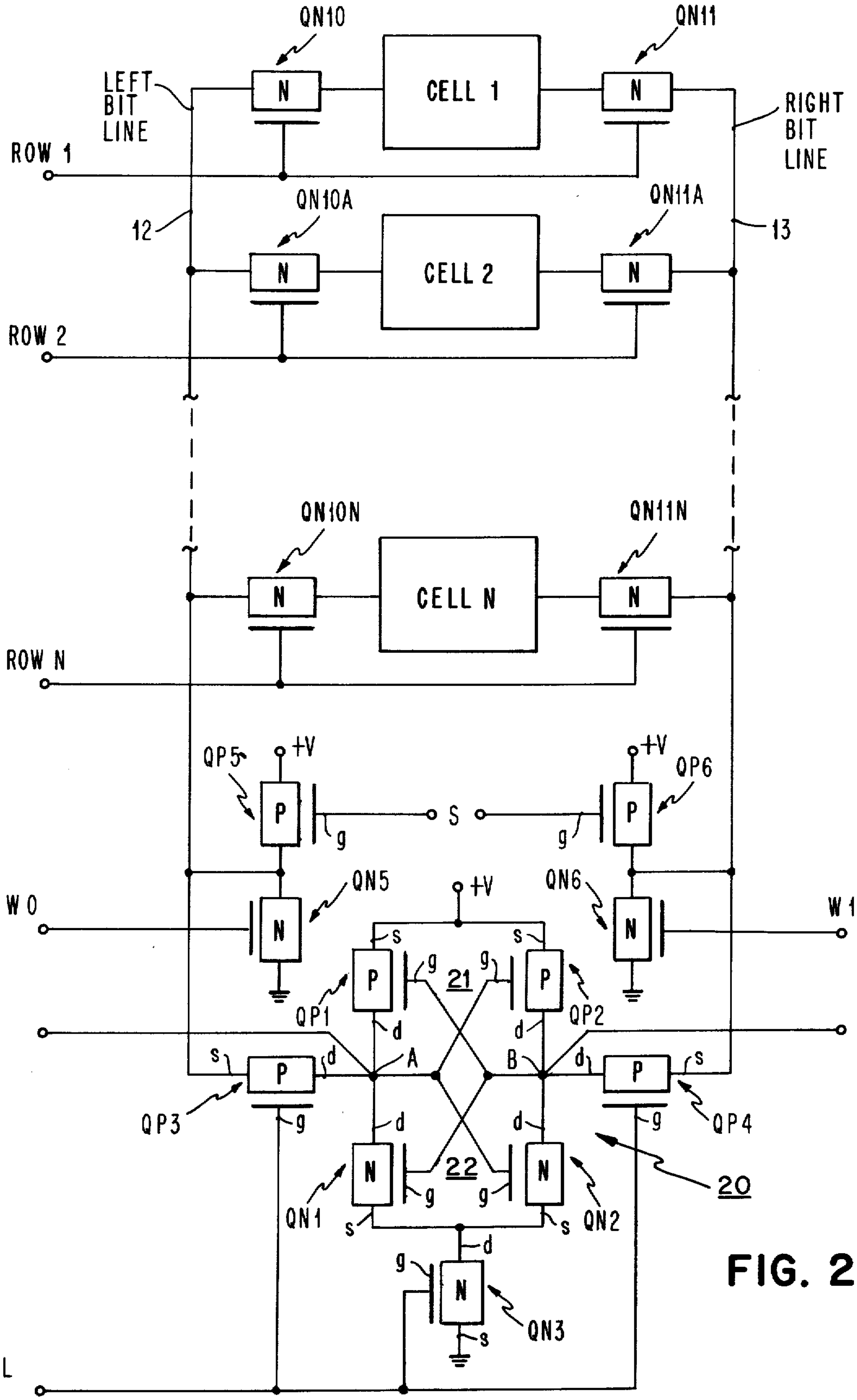
FIG. 2 is a schematic diagram of a typical storage cell organization utilizing a sense amplifier constructed in accordance with the present invention.

To this end, and referring first to FIGS. 2 and 3, the left and right bit lines (including associated capacitances) may be brought or charged up to V+ potential by turning on switches, in the illustrated instances FET means QP5 and QP6. This is accomplished by bringing input S, to the gates *g* of devices QP5 and QP6, to zero volts. This permits QP5 and QP6 to conduct and allows the bit lines to be raised to a V+ potential. Approximately simultaneous with the bringing of line S to zero volts, source L is also brought from V+ potential to zero volts thereby permitting QP3 and QP4 to conduct, and allowing nodes A and B to raise to the V+ potential. Assume that a particular cell is selected, for example cell N, row N (see FIG. 2) is brought up to V+ volts, and assuming that the state of the cell is that the node or junction 15 (see FIG. 1) is at zero volts, sensing current will flow from the left bit line through Q1ON into cell N and then to ground through FET menas QN12 (FIG. 1) discharging the left bit line. Simultaneously line S is then returned to V+ cutting off transitors QP5 and QP6 and current flows into the left side of the cell N discharging the left bit line capacitance and lowering the bit line voltage. Inasmuch as QP3 as well as QP4 of the sense amplifier are biased into conduction, node A will track with the left bit line lowering the voltage at A. At this point in time line L is returned to the second potential or V+ volts, causing QN3 to conduct and biasing transistors QP3 and QP4 into the non-conducting state. This sets the latch and disconnects the sense amplifier from the bit sense lines. Inasmuch as the voltage at node B is higher than the voltage at node A, QN1 turns on, QN2 turns off, QP1 turns off and QP2 turns on. In this manner a full logic output is available from either A or B or both as the case may be. As may be seen in the timing chart of FIG. 3, the row line selected, i.e., row N may be turned off at any time. It should be obvious that the recharge of the bit lines may be effected well in advance of the row line selection.

Figure 4:
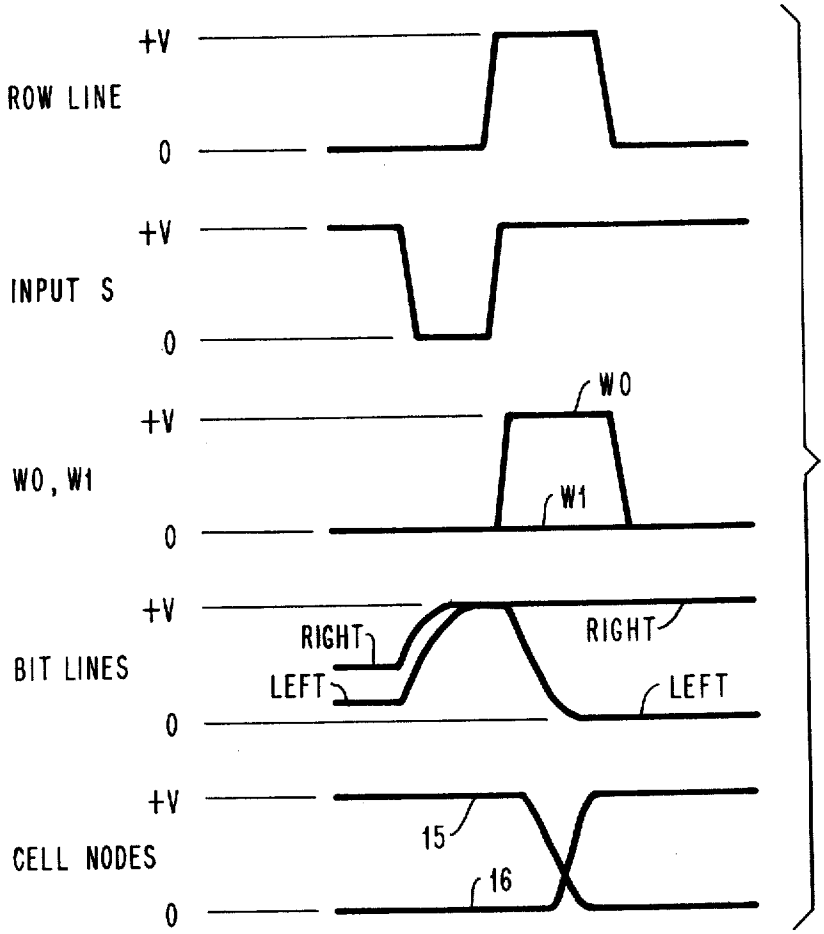
FIG. 4 is a write timing chart used in conjunction with the storage cell organization and sense amplifier of FIG. 2.

The write operation for the memory cells is as follows: As before, transistors QP5 and QP6 are used to charge the right and left bit sense lines 12 and 13 respectively to V+ voltage by bringing the potential at source S to zero volts. The potential at S is then raised to V+ volts. Then either QN5 or QN6 is turned on by raising one of inputs $W_0$ or W1 to V+ volts. The corresponding bit line, in this manner, is shunted to ground and therefore lowered to zero volts. For example, and referring to the write diagram in FIG. 4, suppose $W_0$ is raised to the V+ potential. Assuming that the left cell node, for example the node 15 (FIG. 1) was at substantially V+ potential, and node 16 was at substantially zero potential, current will flow out of the high side of the cell selected and into the low side and the cell will change state. During the write operation it should be noted that the signal input means are off thereby preventing the sense amplifier from loading the bit lines.

In the embodiment of the invention illustrated in FIG. 2, wherein the means for biasing the signal input means and the pulse source means to opposite states of conduction are one and the same, it is essential that the conduction-type of the tranistors of the input means be opposite to that of pulse source means. Thus, although as shown in FIG. 2 QP3 and QP4 are of the P conduction type, and QN3 is of the N conduction type, QP3 and QP4 may be made of the N conduction-type while QN3 may be of the P conduction type.

Figure 5:
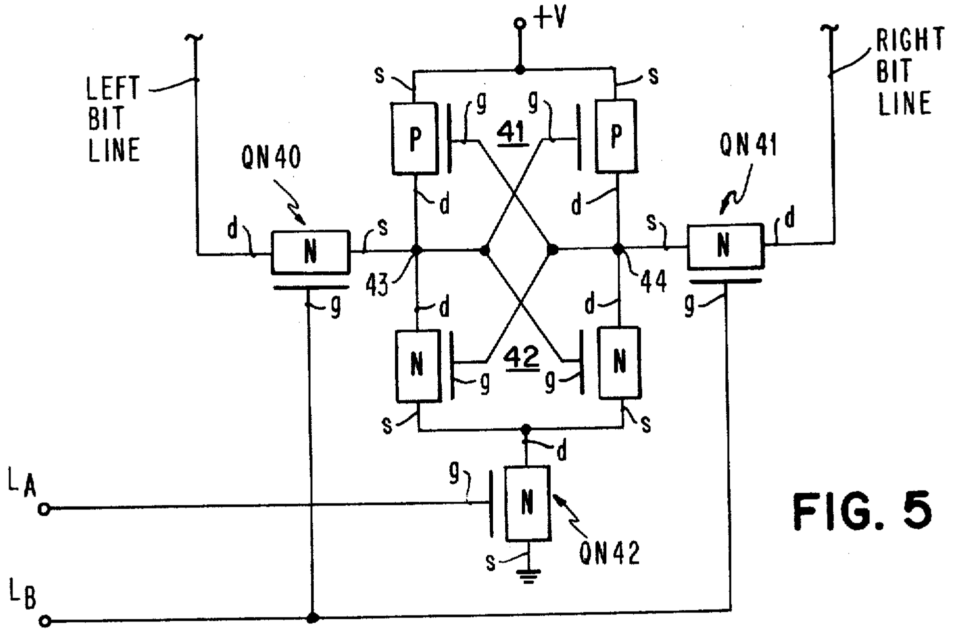
FIG. 5 is a schematic diagram of another embodiment of the sense amplifier of the present invention.

If for reasons of convenience or timing it is desirable to construct both the input signal means and the pulse sourse means of the same conductive types, then the means for biasing the signal input and the pulse source means to opposite states of conduction will of necessity be comprised of two sources of pulses to properly gate the input signal into the cell and to set the latch. For example, as illustrated in FIG. 5, the four device cell illustrate a first and second pair of cross coupled FET means 41 and 42 respectively, each of the FET means having a gating electrode and first and second gated electrodes as heretofore described relative to FIG. 2. (Note that the gating electrode is designated *g* and the appropriate source and drains are marked *s* and *d*. As illustrated, means are provided to interconnect the pairs 41 and 42 to form first and second common nodes 43 and 44 respectively to provide an output from a selected one of the nodes. As before, active first and second signal input means comprising, in the illustrated instance, N channel conduction type FET means QN40 and QN41, are connected respectively to the first and second nodes, each of the FET means having a gating electrode and two gated electrodes. In the illustrated instance the drains of the FET means are connected to the left and right bit lines respectively.

As illustrated in FIG. 5 and as heretofore described, pulse source means, in the illustrated instance an N channel conduction type FET means QN42 is connected to a gated electrode of each FET means of one pair, as illustrated the pair 42. Once again, the FET means QN42 includes appropriately designated gated electrodes (source *s* and drain *d*) and a gating electrode or gate *g* of the FET. Additionally, and as illustrated in FIG. 5, inasmuch as the first and second signal input means and the pulse source means are of the same conduction type, then separate pulsing sources LA and LB are essential to bias the signal input means and the pulse source means to opposite states of conduction to effect a full logic output from the nodes 43 and 44 and to achieve isolation of the right and left bit sense lines.

Thus the sense amplifier of the present invention provides good isolation from the bit sense lines to prevent loading thereby, makes faster switching for logic, such as a buffer connected to the output of the sense amplifier, and simultaneously gives a full logic output.

Additionally, although the sense amplifier includes means for receiving a signal input from each rail of a double rail memory organization, it should be understood that the sense amplifier of the present invention may also be useful with a single rail or only one bit sense line. Additionally, it should be recognized that additional signal input means, which are connected to other pairs of bit lines, may be coupled to the nodes A and B of the sense amplifier, so that one sense amplifier services more than one memory organization. Of course separate pulse source means (similar to L) must be employed to permit gating into the nodes.

The phrases "negligible impedance" and "negligible impedance means " have been used at various places herein to describe the manner in which the two transistors of a flip-flop circuit branch are connected to each other and cross-coupled to the transistors in the other circuit branch. In the schematic drawings of the circuits, these connections are shown as wires and, as is known, a short wire has very little resistance. However, in the actual construction of the circuit, the connection may have some incidental impedance. An example is a circut constructed in monolithic form employing integrated circuit techniques. It frequently happens there that so-called cross-overs of interconnections cannot be avoided for practical purposes. In that event, one of the interconnections sometimes is made via a tunnel in the semiconductor material or by a "well." The interconnection may include a small section of semiconductive material. Any of these techniques may introduce some incidental impedance. The phrases "negligible impedance" and "negligible impedance means" are used in a generic sense herein and in the appended claims to include incidental impedances.

Although the invention has been described with a certain degree of particularity, it is understood that the present disclosure has been made only by way of example and that numerous changes in the details of the circuit, the combination and arrangement of parts, and the method of operation may be made without departing from the spirit and the scope of the invention as hereinafter claimed.

What is claimed is:

1. A sense amplifier comprising:

a first and second pair of cross coupled FET means, each FET means having a gating electrode and first and second gated electrodes, means interconnecting said pairs to form first and second common nodes providing an output from a selected one of said nodes; active first and second signal input means connected respectively to said first and second nodes; active pulse source means connected to a gated electrode of each FET means of one pair, and means electrically coupled to said signal input means and said pulse source means for biasing said signal input means and said pulse source means to opposite states of conduction.

2. A sense amplifier in accordance with claim 1 wherein said first and second pair of cross coupled FET means are of different conductive types.

3. A sense amplifier in accordance with claim 1 wherein said signal input means comprises FET means of a first conductive type and said pulse source means comprises an FET means of a second conductive type.

4. A sense amplifier in accordance with claim 3 wherein said means for biasing said signal input means and said pulse source means includes negligible impedance means connecting said gating electrodes together.

5. A sense amplifier in accordance with claim 1 wherein said signal input means and said pulse source means comprise FET means of the same conductive type.

6. A sense amplifier in accordance with claim 5 wherein said means for biasing said signal input means and said pulse source means includes a first negligible impedance means connecting the gating electrode of said signal input means and a second negligible impedance means connecting the gating electrode of said pulse source means.

7. A sense amplifier in accordance with claim 1 including at least one six device, complementary storage cell cónnected to each of said first and second signal input means.

8. A sense amplifer comprising: a first cross coupled pair of FET means of a first conductive type, and a second cross coupled pair of FET means of a second conductive type; means connecting said first pair of FET means to said second pair of FET means at a pair of common nodes; a first transistor of a first conductive type having a gating electrode and first and second gated electrodes, one of said gated electrodes being connnected to one of said nodes; a second transistor of a first conductive type having a gating electrode and first and second gated electrodes, one of said gated electrodes being connected to the other of said nodes; and a third transistor of a second conductive type having a gating electrode and first and second gated electrodes; one of said gated electrodes being connected to each of said FET means of one of said pairs of FET means; and including means electrically interconnecting said first, second and third gating electrodes whereby when said first and second transistors conduct, said third transistor is cut off, and when said first and second transistors are cut off, said third transistor conducts.

9. A sense amplifier in accordance with claim 8 wherein said first, second and third transistors comprise field effect transistors.

10. A sense amplifier in accordance with claim 8 including at least one six device complementary semiconductor, field effect transistor storage cell connected to one of the gated electrodes of said first transistor and to a gated electrode of said second transistor.

11. An FET sense amplifier for converting a double rail differential memory output signal to a full-logic output signal, comprising: a first cross coupled pair of FET means and a second cross coupled pair of FET means; a pair of nodes common to said first and second pairs of FET means providing an output at a selected one of said nodes; first and second FET means connected respectively to said first and second nodes, a source of power having at least two potentials, one of said potentials being connected to one of the gated electrodes of a cross coupled pair of FET means, and a third FET means connected between the gated electrodes of the other of said pairs of FET means and the second potential of said power source; and means for biasing said first and second FET means and said third FET means to opposite states of conduction whereby when said first and second FET means conduct, said third FET means is cut off, and when said third FET means conducts, said first and second FET means are cut off.

12. An FET sense amplifier in accordance with claim 11 wherein said first and second FET means are of a first conductive type and said third FET means is of a second conductive type.

13. A sense amplifier comprising: a first and second pair of cross coupled FET means, means interconnecting said pairs to form first and second common nodes providing an output from a selected one of said nodes; active signal input means connected to one of said nodes; a source of power having first and second potentials; active pulse source means connected intermediate the second pair of cross coupled FET means and said first potential, and means electrically coupled to said signal input means and said pulse source means for biasing said signal input means and said pulse source means to opposite states of conduction.

14. A sense amplifier in accordance with claim 13 wherein said second potential is connnected to said first pair of FET means.

15. A sense amplifier in accordance with claim 13, wherein said active signal input means comprises FET means of a first conductive type and said pulse source means comprises FET means of a second conductive type.

16. A sense amplifier in accordance with claim 13 including a second active signal input means connected to the other of said nodes, and including means for biasing said signal input means into states of conduction and non-conduction as desired.

* * * * *